United States Patent Office 3,382,148
Patented May 7, 1968

3,382,148
COMPOSITION AND METHODS FOR CONTROLLING COCCIDIOSIS IN POULTRY
Hans Thommen, Therwil, Switzerland, assignor to Hoffmann-La Roche Inc., Nutley, N.J., a corporation of New Jersey
No Drawing. Continuation-in-part of application Ser. No. 473,485, July 20, 1965. This application Apr. 18, 1967, Ser. No. 631,621
Claims priority, application Switzerland, Aug. 21, 1964, 11,001/64
8 Claims. (Cl. 167—53.1)

ABSTRACT OF THE DISCLOSURE

Anticoccidial and growth-promoting compositions comprising 4-sulfanilamido-2,6-dimethoxypyrimidine and 2,4-diamino-5-(3,4-dimethoxybenzyl)pyrimidine.

CROSS-REFERENCE TO RELATED APPLICATION

This application is a continuation-in-part of Ser. No. 473,485, filed July 20, 1965, now abandoned.

BACKGROUND OF THE INVENTION

In poultry, coccidiosis is a very widespread disease which occurs in the form of severe intestinal infections and often proves fatal. This disease is produced by infection with protozoa of the genus Eimeria such as, for example, *Eimeria tenella*. The compositions in accordance with the invention make possible successful control of coccidiosis by preventing checking and/or curing said disease. Control of the disease is accomplished by administering the composition of the invention to poultry (e.g., hens or turkey cocks) in effective quantities. They also exert a growth-promoting action in poultry and accordingly, are also useful as growth-promoting agents.

SUMMARY OF THE INVENTION

The anticoccidial and growth-promoting compositions in accordance with the invention contain (a) a physiologically acceptable carrier material, e.g., solid or liquid poultry feed or drinking water, (b) 4-sulfanilamido-2,6-dimethoxypyrimidine (hereinafter referred to as Compound I) or a salt thereof with a pharmaceutically acceptable base, and (c) 2,4-diamino-5-(3,4-dimethoxybenzyl)pyrimidine (hereinafter referred to as Compound II) or a salt thereof with a pharmaceutically acceptable acid.

DETAILED DESCRIPTION OF THE INVENTION

The anticoccidial and growth-promoting compositions of the invention contain (a) a physiologically acceptable carrier material, e.g., solid or liquid poultry feed or drinking water, (b) 4-sulfanilamido-2,6-dimethoxypyrimidine (hereinafter referred to as Compound I) or a salt thereof with a pharmaceutically acceptable base, and (c) 2,4-diamino-5-(3,4-dimethoxybenzyl) pyrimidine (hereinafter referred to as Compound II) or a salt thereof with a pharmaceutically acceptable acid. The compositions of the invention control coccidiosis by preventing, checking and/or curing the disease.

The compositions of the invention are prepared by mixing Compounds I and II in uniform and finely divided form in a liquid or solid feed, or dispersing them in poultry drinking water. Standard commercial poultry feed products can be used as the liquid or solid feed. Additionally, other compositions containing ingredients suitable for poultry nutrition can also be employed such as animal feed products. For controlling coccidiosis in poultry, the instant compositions contain between about 0.010 and about 0.050 weight percent, preferably about 0.0125 and about 0.0250 weight percent, of a mixture of Compounds I and II, wherein Compound II is present in from about 5 to about 30, preferably about 15 to about 30 weight percent of the total weight of the mixture of Compounds I and II. For producing a promotion of growth, the instant composition contains between about 0.006 and about 0.0125 weight percent, of a mixture of Compounds I and II, wherein Compound II is present in from about 5 to about 30, preferably about 15 to about 30 weight percent of the total weight of the mixture of Compounds I and II. In special cases it may be convenient to use concentrations which are smaller or larger than the values named above.

A uniform distribution of Compounds I and II in the carrier material can easily be effected according to the usual methods, by mixing, grinding, stirring, or with solid feed, spraying dilute solutions (preferably in water) of Compounds I and II onto feed. Both Compounds I and II are only water soluble in the form of their salts. Therefore, for the manufacture of aqueous preparations, salts must be employed or an aqueous dispersion must be prepared using the usual emulsifiers. The alkali metal salts such as the sodium or potassium salt are especially suitable as salts of Compound I. Compound II forms acid addition salts with pharmaceutically acceptable acids, e.g., mineral acids such as hydrochloric, hydrobromic, sulfuric, phosphoric, nitric, etc., organic acids, such as acetic, benzenesulfonic, toluenesulfonic, etc., which can be used for this purpose. As emulsifiers, the nonionic emulsifiers are preferred, e.g., polyoxyethylene sorbitan monooleate or laurate or polyoxyethylene ricinoleate, etc.

When a feed in which the mixture of Compounds I and II have been incorporated in accordance with the invention is administered to poultry, an undisturbed feed uptake is observed, even after infection with sporulated oocysts. The general condition of the poultry remains unaltered and no clinical manifestation is observed.

In another embodiment of the invention, Compounds I and II can also be utilized in compositions in the form of concentrates which then, as additives, are diluted with the basic feed prior to feeding. The compositions in the form of concentrates contain the above mixture of Compound I and II in concentrations of about 5 to about 95 weight percent, preferably about 10 to about 25 weight percent of the weight of concentrate, the remainder being a physiologically acceptable carrier material, such as those employed above, or one or more of the following: grain, side products of the milling industry, ground oil cake, distillation residues of the fermentation industry, finely divided mineral materials, ground oyster shells, silicon dioxide, etc. Fats, oils antioxidants and surface active materials can also be employed as the carrier material for these concentrates.

In addition to Compounds I and II, other preparations of veterinary-medicinal activity can be added to the compositions of the invention.

Example 1

Groups of ten, weighed, two-week-old chicks, were fed with a feed containing for each kg. of feed, 60 or 125 mg. of a mixture of 4-sulfanilamido-2,6-dimethoxypyrimidine (80 weight percent) and 2,4-diamino-5-(3,4-dimethoxybenzyl)pyrimidine (20 weight percent). 72 hours after starting the feeding of the above feed, each chick was infected per os with 100,000 sporulated oocysts of *Eimeria tenella*.

Control groups, each of ten, weighed, two-week-old chicks, were fed with the same feed to which, however, none of the above mixture of compounds was added, and were each likewise infected per os with 100,000 sporulated oocysts. After an experiment duration of eight days, the chicks which were still alive, from both the test and control groups were killed, weighed, and examined for pathological changes. The results were compiled in the following table:

| Mixture of 4-sulfanilamido-2,6-dimethoxypyrimidine and 2,4-diamino-5-(3,4 dimethoxybenzyl)pyrimidine in feed in percent | Mortality, percent | Weight Increase in percent | Caecal damage |
|---|---|---|---|
| Nil | 60 | 25 | Strong. |
| 0.006 | 0 | 70 | Very slight.* |
| 0.125 | 0 | 80–90 | None |

*By "strong" is meant severe damage of the epithelium with heavy bleedings. By "very slight" is meant slightly damaged epithelium accompanied by single bleedings.

Analogous results were obtained when the above mixture of 4 - sulfanilamido - 2,6 - dimethoxypyrimidine and 2,4-diamino-5-(3,4-dimethoxybenzyl)pyrimidine was employed in a ratio of 70:30 weight percent rather than 80:20 weight percent as above.

Example 2

The synergistic action of the compositions of this invention in controlling coccidiosis in poultry was demonstrated as follows:

Ten chickens approximately three weeks old per group were employed for each drug group as a non-infected weight control group and as an infected control group. The drug was given orally by diet 72 hours in advance of the infection at dosage levels as indicated. The infection consisted of approximately 125,000 oocysts of *E. tenella* given orally. The stools were observed for clinical symptoms of intestinal hemorrhaging four and five days after infection. The severity of lesions in the intestinal tract is indicated by observing the amount of blood present in the tools and rated as follows:

$\phi$ = no blood present
(+1) = trace of blood
+1 = blood present occasionally
+2 = moderate amount of blood
+3 = heavy amount of blood The results obtained when compound A and componnd B were administered singly and in combination according to the procedure described above were as follows:

claim 1, wherein 2,4-diamino-5-(3,4-dimethoxybenzyl) pyrimidine or a salt thereof with a pharmaceutically acceptable acid is present in from about 15 to about 30 percent by weight of the weight of the mixture.

3. A composition for controlling coccidiosis in poultry which comprises:
   (a) a physiologically acceptable carrier material;
   (b) 4-sulfanilamido-2,6-dimethoxypyrimidine or a salt thereof with a pharmaceutically acceptable base; and
   (c) 2,4-diamino-5-(3,4 - dimethoxybenzyl)pyrimidine or a salt thereof with a pharmaceutically acceptable acid wherein the above composition contains from about 0.0125 to about 0.0250 percent by weight of a mixture of (b) and (c) wherein compound (c) is present in from about 5 to about 30 percent by weight of the weight of the mixture of (b) and (c).

4. An anticoccidial composition in accordance with claim 3, wherein 2,4-diamino-5-(3,4-dimethoxybenzyl) pyrimidine or a salt thereof with a pharmaceutically acceptable acid is present in from about 15 to about 30 percent by weight of the weight of the mixture of (b) and (c).

5. A method for controlling coccidiosis in poultry, which comprises administering to said poultry an effective amount of a composition comprising 4-sulfanilamido-2,6-dimethoxy pyrimidine or a salt thereof with a pharmaceutically acceptable base and 2,4-diamino-5-(3,4-dimethoxybenzyl)pyrimidine or a salt thereof with a pharmaceutically acceptable acid wherein the 2,4-diamino-5-(3,4-dimethoxybenzyl)pyrimidine is present in from about 5 to about 30 percent by weight of the weight of the mixture.

6. A method in accordance with claim 5, wherein 2,4-diamino-5-(3,4-dimethoxybenzyl)pyrimidine or a salt thereof with a pharmaceutically acceptable acid is present in from about 15 to about 30 percent by weight of the weight of the mixture.

7. A method of controlling coccidiosis in poultry which comprises administering to said poultry an effective amount of a composition comprising:
   (a) a physiologically acceptable carrier material;
   (b) 4-sulfanilamido-2,6-dimethoxypyrimidine or a salt thereof with a pharmaceutically acceptable base;

| Compound | Dose (Weight percent in feed) | E. tenella [1] Blood in Stools 4 days after infection | E. tenella [1] Blood in Stools 5 days after infection | E. tenella [2] Blood in Stools 4 days after infection | E. tenella [2] Blood in Stools 5 days after infection |
|---|---|---|---|---|---|
| A | 0.025 | $\phi$ | +2 | +2 | +2 |
|   | 0.0125 | +2 | +2 | +2 | +2 |
| B | 0.0125 | +1 | +2 | +1 | +2 |
|   | 0.009 | +2 | +2 | +2 | +2 |
|   | 0.006 | +2 | +2 | +2 | +2 |
|   | 0.003 | +3 | +3 | +2 | +2 |
| A+B (5% B) | .0237 A+.00125 B | $\phi$ | $\phi$ | $\phi$ | $\phi$ |
| A+B (10% B) | .0225 A+.0025 B | $\phi$ | $\phi$ | $\phi$ | $\phi$ |
| A+B (15% B) | .010625 A+.001875 B | $\phi$ | $\phi$ | $\phi$ | $\phi$ |
| A+B (20% B) | .010 A+.0025 B | $\phi$ | $\phi$ | $\phi$ | $\phi$ |
| A+B (30% B) | .0175 A+.0075 B | $\phi$ | $\phi$ | $\phi$ | $\phi$ |
|   | .00875 A+.00375 B | $\phi$ | $\phi$ | $\phi$ | $\phi$ |
| Uninfected, Untreated Control. |   | $\phi$ | $\phi$ |   |   |
| Infected, Untreated Control. |   | +3 | +3 |   |   |

[1] HLR Hoechst strain of *E. tenella*.  [2] HLR ARD strain of *E. tenella*.

I claim:

1. A composition for controlling coccidiosis in poultry, which comprises 4-sulfanilamido-2,6-dimethoxy pyrimidine or a salt thereof with a pharmaceutically acceptable base and 2,4-diamino-5-(3,4-dimethoxybenzyl)pyrimidine or a salt thereof with a pharmaceutically acceptable acid wherein 2,4-diamino-5-(3,4-dimethoxybenzyl)pyrimidine or a salt thereof with a pharmaceutically acceptable acid is present in from about 5 to about 30 percent by weight of the weight of the mixture.

2. An anticoccidial composition in accordance with and
   (c) 2,4-diamino-5-(3,4 - dimethoxybenzyl)pyrimidine or a salt thereof with a pharmaceutically acceptable acid wherein the above composition contains from about 0.0125 to about 0.0250 percent by weight of a mixture of (b) and (c) wherein compound (c) is present in from about 5 to about 30 percent by weight of the weight of the mixture of (b) and (c).

8. A method in accordance with claim 7, wherein 2,4-diamino-5-(3,4-dimethoxybenzyl)pyrimidine or a salt thereof with a pharmaceutically acceptable acid is present in from about 15 to about 30 percent by weight of the weight of the mixture of (b) and (c).

References Cited

UNITED STATES PATENTS 2,823,160  2/1958  Lux _____ 167—53.1

OTHER REFERENCES

Tsunda, Veter. Bull., vol. 34 (1964), page 139.

ALBERT T. MEYERS, *Primary Examiner.*

S. J. FRIEDMAN, *Assistant Examiner.*